US011835033B2

United States Patent
Länger-Möller et al.

(10) Patent No.: US 11,835,033 B2
(45) Date of Patent: Dec. 5, 2023

(54) METHOD FOR OPERATING A WIND POWER INSTALLATION, WIND POWER INSTALLATION AND WIND FARM

(71) Applicant: Wobben Properties GmbH, Aurich (DE)

(72) Inventors: Annika Länger-Möller, Aurich (DE); Andreas von Albedyll, Bremen (DE); Christoph Scheit, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/518,378

(22) Filed: Nov. 3, 2021

(65) Prior Publication Data

US 2022/0136484 A1    May 5, 2022

(30) Foreign Application Priority Data

Nov. 4, 2020    (EP) .................................... 20205607

(51) Int. Cl.
*F03D 7/04*    (2006.01)
*F03D 7/02*    (2006.01)

(52) U.S. Cl.
CPC ........... *F03D 7/048* (2013.01); *F03D 7/0224* (2013.01); *F03D 7/0276* (2013.01);
(Continued)

(58) Field of Classification Search
CPC ...... F03D 7/0224; F03D 7/0276; F03D 7/048; F05B 2270/303; F05B 2270/32;
(Continued)

(56) References Cited

U.S. PATENT DOCUMENTS 11,131,291 B2 * 9/2021 Messing ............... F03D 7/0224
2013/0280066 A1 * 10/2013 Scholte-Wassink ........................
F03D 7/0224
416/1

(Continued)

FOREIGN PATENT DOCUMENTS

EP    1918581 A2    5/2008
EP    3317519 B1    6/2020
(Continued)

*Primary Examiner* — Tulsidas C Patel
*Assistant Examiner* — Thomas K Quigley
(74) *Attorney, Agent, or Firm* — SEED INTELLECTUAL PROPERTY LAW GROUP LLP

(57) ABSTRACT

The present disclosure relates to a method for operating a wind power installation, to an associated wind power installation and to a wind farm. The method comprises the following steps: determining at least two, preferably at least three and particularly preferably all the environmental parameters of the environment of the wind power installation selected from the list consisting of: turbulence intensity, air density, air temperature and shear; providing boundary conditions for operating the wind power installation, the boundary conditions containing at least one from a load boundary condition, a noise level boundary condition and a power boundary condition; adapting an operational control, in particular an operating point and/or an operating characteristic, of the wind power installation on the basis of a combination of the changes in the determined environmental parameters taking into consideration the boundary conditions.

18 Claims, 4 Drawing Sheets

(52) U.S. Cl.
CPC ... *F05B 2270/303* (2013.01); *F05B 2270/305* (2013.01); *F05B 2270/32* (2013.01); *F05B 2270/324* (2013.01); *F05B 2270/325* (2013.01); *F05B 2270/327* (2013.01); *F05B 2270/328* (2013.01); *F05B 2270/333* (2013.01)

(58) Field of Classification Search
CPC .......... F05B 2270/324; F05B 2270/325; F05B 2270/327; F05B 2270/328
See application file for complete search history.

(56) References Cited

U.S. PATENT DOCUMENTS

| | | | |
|---|---|---|---|
| 2014/0203563 A1* | 7/2014 | Bowyer | F03D 7/0268 |
| | | | 290/44 |
| 2018/0171978 A1 | 6/2018 | Spruce | |
| 2019/0277257 A1* | 9/2019 | Nielsen | F03D 17/00 |
| 2019/0301429 A1* | 10/2019 | Messing | F03D 7/0224 |
| 2020/0102934 A1 | 4/2020 | Messing et al. | |
| 2020/0116126 A1* | 4/2020 | Jamuna | F03D 7/04 |

FOREIGN PATENT DOCUMENTS

| | | | | |
|---|---|---|---|---|
| WO | WO-2018109100 A1 * | 6/2018 | ........... | F03D 7/0224 |
| WO | WO-2019150400 A1 * | 8/2019 | ........... | F03D 1/0675 |

\* cited by examiner

METHOD FOR OPERATING A WIND POWER INSTALLATION, WIND POWER INSTALLATION AND WIND FARM

BACKGROUND

Technical Field

The present invention relates to a method for operating a wind power installation, to an associated wind power installation and to a wind farm.

Description of the Related Art

It is known to carry out yield calculations for wind power installations having location-specific parameters. However, it has turned out in this case that the subsequently established yields differ because of the actual location conditions.

BRIEF SUMMARY

The present disclosure is directed to using operational control to pick up possible power losses due to the location conditions and to improve the individual operational control of the wind power installation in accordance with the location. An adaptation of the operational control to locations with extreme environmental or wind conditions has at the same time to ensure the maintaining of the loads and noise output level in order to permit an optimum setting even for more complex locations.

The following terms and common abbreviations are given for the description below.

AEP: Annual Energy Production;

$\alpha_{min}$/minimum blade angle: Corresponds to the blade angle, i.e., the pitch angle of a rotor blade, with which the wind power installation is at least operated in a partial load range. Increases in the blade angle are possible, for example, because of loads, and power and/or noise requirements.

Operating characteristic: Relationship of rotational speed n of the rotor and generated electrical power $P_{el}$, to which the wind power installation is adjusted during operation.

Operating point: Discrete point of the operating characteristic and a defined pitch angle of the rotor blades, which is achieved at a wind speed.

$C_p$: Power coefficient of the wind power installation, which specifies how much power the wind power installation can harvest in relation to the existing wind power.

$C_t$: Thrust coefficient of the wind power installation, which specifies how much thrust (force coming perpendicularly out of the rotor plane) the wind power installation generates in relation to a closed circular surface.

$\lambda$/TSR: Tip-speed-ratio. This is a ratio of the speed of the rotor blade at the rotor blade tip to the wind speed.

Load reserve: Difference in the instantaneous load or the location load conditions from the design load case.

Power reserve: Difference in the electrical power to possible electrical power.

Noise level reserve: Difference in the generated noise level from the permissible noise level.

$M_x$: Blade moment in the chordwise direction $M_y$: Blade moment in the flapwise direction IPC: Individual Pitch Control, the pitch angles of the individual rotor blades can be controlled independently of one another—in addition to a collective control.

In one aspect of the present disclosure, a method for operating a wind power installation is proposed, wherein the method comprises the following steps:

determining at least two, preferably at least three and particularly preferably all of the environmental parameters of the environment of the wind power installation, selected from the list consisting of: turbulence intensity, air density, air temperature, shear and precipitation, providing boundary conditions for operating the wind power installation, the boundary conditions containing at least one from a load boundary condition, a noise level boundary condition and a power boundary condition, adapting an operational control, in particular an operating point and/or an operating characteristic, of the wind power installation on the basis of a combination of the changes in the determined environmental parameters taking into consideration the boundary conditions.

The environmental parameters can be determined beforehand, i.e., before commissioning or even before erecting the wind power installation. Alternatively or additionally, the environmental parameters are preferably determined during the operation of the wind power installation. In order to determine the environmental parameters, suitable sensors are preferably provided on the wind power installation or in the environment of the wind power installation. The type and configuration of the sensors for determining the environmental parameters are not restricted as long as they are suitable for determining one or more of the environmental parameters of turbulence intensity, air density, air temperature, shear and precipitation.

The load boundary condition can be, for example, a load which is permissible according to the design. The noise level boundary condition can comprise, for example, a permissible noise level. The power boundary condition can comprise, for example, a possible electrical power and/or a maximum grid power, wherein also other boundary conditions indicative of the power, such as torque limits, etc., are conceivable.

Particularly preferably, an environmental parameter based on the wind speed is additionally provided. This can be, for example, directly the wind speed, a wind direction, but in particular also an average annual wind speed relevant for taking the loads into consideration, or a distribution of the wind speeds and/or wind directions.

The operating characteristic used is preferably the rotational speed/power characteristic that is conventional in the region of wind power installations and which, for different rotational speeds n of the rotor, specifies a power to be adjusted (more specifically: a value indicative of the power), such as the electrical power $P_{el}$ or the air gap power to be provided by the rotor, or else a torque at the generator. Other characteristics can also be understood as the operating characteristic within the meaning of the disclosure, for example a characteristic which is referred to as a pitch characteristic and which specifies the pitch angle of the rotor blades for a certain wind speed and/or electrical power and/or air gap power is conceivable. Other characteristics are also conceivable as operating characteristics.

According to the aspect, the increase in the maximum possible power by individual adaptation of the operating characteristic or of the operating point, for example of the pitch adjustments, can accordingly contribute to increasing the annual energy production. In particular, the boundary conditions, such as load boundary condition and noise level boundary condition, can be exhausted in order to use reserves in relation to the design operating loads, by individual adaptation of the operating characteristic and the pitch adjustments, in order to optimize the annual energy production.

The adaptation of the operating point preferably comprises the following steps:

providing the current operating point of the wind power installation, determining each adaptation of the operational control of the wind power installation on the basis of a change in one of the determined environmental parameters and on the current operating point, adapting the operational control of the wind power installation on the basis of a combination of the determined adaptations taking into consideration the boundary conditions.

According to this embodiment, i.e., on the basis of an individual change in one of the environmental parameters, an individual adaptation of the operational control is determined. These adaptations can reinforce one another or else contradict one another depending on the case. The adaptation then takes place only after the determined individual adaptations are combined, with the boundary conditions also being taken into consideration. The operational control can therefore be optimally adapted even in the event of a plurality of changing environmental parameters.

For example, the adaptation for a change of each of the determined environmental parameters can be selected from a list of possible adaptations. The selection from the list of possible adaptations is preferably undertaken by taking into consideration all the changes in the environmental parameters. In other words, one or more adaptation candidates from the list of possible adaptations can be selected here per environmental parameter, and the final adaptation can be selected from the one or more selected adaptation candidates taking into consideration all of the determined environmental parameters. In this case, an optimum selection of the suitable measure or adaptation for the combination of environmental parameters is possible without already requiring an unnecessary restriction to a certain adaptation for the individual environmental parameters.

The environmental parameters are preferably determined on a recurring basis, in particular periodically and particularly preferably continuously during the operation of the wind power installation.

The environmental parameter or the environmental parameters is or are determined, for example, by means of measurement. Alternatively or additionally, the environmental parameters are calculated and/or approximated.

Particularly preferably, the operational control is accordingly then also adapted on a recurring basis, in particular periodically or continuously.

Preferably, the adaptation of the operating point and/or of the operating characteristic comprises at least one of the following measures if the taking into consideration of the load boundary condition, a noise level boundary condition and a power boundary condition specifies at least one load reserve, a noise level reserve or a power reserve:

adapting, in particular reducing, a minimum blade angle, and adapting, in particular reducing, the tip-speed-ratio, in order to reduce the distance of the operating point from the operating point with an optimum power coefficient, shifting or changing a characteristic for controlling the pitch angles of the rotor blades, referred to as pitch characteristic, to higher pitch angles for at least part of the operating range, increasing a rotor rotational speed of the wind power installation, raising a nominal power of the wind power installation.

The adaptation preferably comprises at least two of the aforementioned measures; particularly preferably, the adaptation comprises at least three and in particular all the aforementioned measures.

Preferably, the determining of the environmental parameters comprises determining the air density, wherein a reduction in the air density leads to an increase of a load reserve and of a noise level reserve and, as a consequence, to adapting the operational control, a rotor rotational speed is adapted, in particular increased, to compensate for a change in the tip-speed-ratio using the noise level reserve, and/or an operating characteristics and/or a pitch characteristic is adapted using the load reserve.

By means of this adaptation, a reduction in the power caused by a lower density and, in association therewith, a smaller air mass flow can be at least partially compensated for. A change in the rotational speed/power characteristic, either completely or only in a partial load range, i.e., in a range below a nominal power or a full power, with or without adaptation of the pitch control may be optimal depending on the wind power installation. This depends in particular on the load budget of the wind power installation and on further environmental parameters, such as, for example, turbulence intensity.

Preferably, the determining of the environmental parameter of shear comprises determining a shear coefficient, wherein the shear coefficient is indicative of a change in the vertical direction of a wind speed over a rotor plane of a rotor of the wind power installation, a reduction in the shear coefficient corresponds to a more uniform incident flow with relatively lower alternating loads, the shear coefficient is compared with a predetermined shear threshold value, the predetermined shear threshold value corresponds to the shear coefficient with a minimum of the power output, and the operating point is adapted in accordance with a change in the shear coefficient and the comparison of the shear coefficient with the predetermined shear threshold value.

In order to determine the shear threshold value, the wind speed is measured, for example at at least two different heights z, and a shear coefficient $\alpha$ is derived or fitted from the difference in accordance with the logarithmic and/or the potential law, for example in accordance with IEC 61400-1:

$$u(z) = u(z_0)\left(\frac{z}{z_0}\right)^\alpha$$

Alternative possibilities for determining the shear threshold value, for example on the basis of acoustic measurements, in particular in accordance with IEC 61400-11, are also conceivable.

For example, $\alpha=0.5$ can be established as the upper limit or as the annual average, wherein higher values are also possible for shorter periods. It is also possible for a plurality of shear threshold values to be possible for short term/medium term and/or long term smoothing, which permits a particularly precise coordination with the actually prevailing shear. In other cases, locations with negative shear coefficients $\alpha$ are also possible.

Different shear coefficients can be established, for example, daily/weekly/monthly, according to requirements, without being restricted thereto.

The design shear coefficient used is preferably a value of between 0.15 and 0.2 which has proven suitable for a typical German coastal location. The design shear coefficient used is preferably a value at which the annual energy production reaches a minimum. In other words, in both cases, if the shear differs from the design shear coefficient, increases in yield can then be achieved if the further boundary conditions permit appropriate control of the wind power installation.

The shear coefficients are preferably ascertained beforehand, i.e., before erecting the wind power installation, by means of measurement masts which carry out wind measurements at the location of the wind power installation. The wind speed is preferably determined for this purpose at least at two heights, particularly preferably at more than two heights. A different determination, for example during operation, is also possible.

Preferably, a power reduction range is defined as a value range of the shear coefficient, for which a reduced speed in the lower half of the rotor disc cannot be compensated for by an increased speed in the upper half of the rotor disc and thus a power reduction takes place, wherein a shear coefficient at a lower end of the power reduction range is defined as the design shear coefficient, and wherein the operating point is adapted in accordance with a change in the shear coefficient and the comparison of the shear coefficient with the design shear coefficient.

In a departure from the previously described preferred refinement, the design shear coefficient rather than the power minimum is used here as the assessment for the adaptation according to the invention of the operating point. In this case, the design shear coefficient is defined as lying at the lower end of the power reduction range.

Preferably, in the event that a reduction in the shear coefficient occurs in the range below the design shear coefficient, the operating point is adapted in such a manner that the additional load and/or angle of attack reserves for increasing the annual energy production result in an increase in the rotational speed and/or in a more aggressive pitch profile, in particular upon individual adjustment (IPC) of individual rotor blades.

The term of pitch profile and that of pitch characteristic is used synonymously here.

Preferably, in the event that an increase in the shear coefficient occurs in the range above the design shear coefficient but within the power reduction range, the operating point is adapted in such a manner that, in order to maintain the necessary load and/or angle of attack reserves, at least one of the following adaptations takes place:
  a) individually adjusting the individual rotor blades in order to reduce the loads in particular in the upper half of the rotor disc,
  b) adjusting the pitch at an earlier point in the upper partial load range in order to reduce the loads, and
  c) reducing the rotational speed in order to maintain the load limits.

Preferably, in the event that an increase in the shear coefficient occurs in the range above the design shear coefficient and outside the power reduction range, the operating point is adapted in such a manner that, in order to maintain the necessary load and/or angle of attack reserves, at least one of the following adaptations takes place:
  a) individually adjusting the individual rotor blades without losses of the annual energy production,
  b) adjusting the pitch at an earlier point in the upper partial load range, and
  c) reducing the rotational speed in order to reduce the loads.

The different preferred refinements relating to the shear coefficient thus permit a specific reaction for all possible changes in the environmental parameters in order to achieve an optimized control of the wind power installation.

Preferably, the determining of the environmental parameters comprises determining the turbulence intensity, wherein a reduction in the turbulence intensity brings about an increase in an angle of attack reserve and an increase in a load reserve, and wherein, upon establishing a reduction in the turbulence intensity, the adaptation of the operational control comprises that:
  a) a tip-speed-ratio and/or a minimum blade angle is reduced in the partial load range in order to increase the power, and
  b) the pitch characteristic is displaced in the upper partial load range towards higher powers in order to compensate for the load and angle of attack reserves which have arisen, or
  c) in addition to a) and alternatively to b), a rotor rotational speed of the wind power plant is increased taking into consideration the noise level boundary condition.

In this embodiment, it is accordingly permitted for the controller of the wind power installation to optimally react to changes in the turbulence intensity.

Preferably, the determining of the environmental parameters comprises determining the temperature and the air density, wherein a reduction in the temperature with the density remaining the same leads to thermal reserves in an electrical section of the wind power installation, wherein, upon establishing a thermal reserve, the adaptation of the operational control comprises that a power is increased, either as a temporary power increase or as a permanent nominal power increase, wherein the increasing of the power in accordance with the noise level boundary condition comprises:
  a) increasing the rotational speed of the rotor with an existing noise level reserve, and/or
  b) increasing the torque without an existing noise level reserve.

In this embodiment, it is accordingly disclosed how an optimum control of the wind power installation is carried out for a changed temperature with the same air density.

Preferably, the determining of the environmental parameters comprises determining the shear and the turbulence intensity, wherein an influence of the shear and of the turbulence intensity on the load and the angle of attack reserve is calculated, and the adaptation of the operational control in accordance with the load and angle of attack reserve comprises at least one of the following measures:
  a) adapting the pitch characteristic, in particular in the partial load range with existing load and angle of attack reserves, reducing the minimum blade angle and/or the tip-speed-ratio; and
  b) briefly increasing the nominal power in order to compensate for the gustiness of the wind.

In this embodiment, it is accordingly disclosed how an optimum control of the wind power installation is carried out for a combination of the parameters of shear and turbulence intensity.

In one embodiment, the minimum blade angle is a blade angle which is defined to the same value for all of the blades and is constant over the complete revolution of the rotor. In a preferred embodiment, a minimum blade angle is defined individually for each rotor blade. Alternatively or additionally, in a particularly preferred embodiment, a minimum blade angle is defined as a function of the angular position of the blade. For example, a sinusoidal fluctuation or other fluctuation about a certain blade angle can be defined with the period of one revolution of the rotor.

Preferably, the determining of the environmental parameters comprises determining the air density and the turbulence intensity, wherein, in the event that both the air density and the turbulence intensity increase, a higher annual energy production, higher loads and a higher noise output level follow, wherein, in this case, the adaptation of the operational control comprises at least one of the following measures:
   a) changing the pitch characteristic by taking into account the decreasing angles of attack due to increased air density and the increasing angles of attack due to increased turbulence intensity;
   b) reducing the rotational speed in order to reduce the loads and the noise output level; and
   c) increasing an angle of attack reserve in the partial load range by increasing the tip-speed-ratio and/or the minimum blade angle,
preferably, in the event that both the air density and the turbulence intensity decrease, at least one, at least two and particularly preferably all the measures a), b) and c) are used in inverted form in order to adapt the operational control.

In this embodiment and in the two embodiments described below, the controls for all possible combinations of the environmental parameters of density and turbulence intensity are accordingly described.

Preferably, the determining of the environmental parameters comprises determining the air density and the turbulence intensity, wherein, in the event that the air density increases and the turbulence intensity decreases, the effects on loads and noise are compensated for, wherein, in this case, the adaptation of the operational control because of the increased angle of attack limits comprises at least one of the following measures:
   a) changing the pitch characteristic in order to increase the annual energy production;
   b) reducing the rotational speed in order to compensate for the increased loads, in particular the load average values.

Preferably, the determining of the environmental parameters comprises determining the air density and the turbulence intensity, wherein, in the event that the air density decreases and the turbulence intensity increases, the effects on loads and noise are compensated for, wherein, in this case, the adaptation of the operational control in order to compensate for decreased angle of attack limits comprises at least one of the following measures:
   a) changing the pitch characteristic by adjusting the pitch at an earlier point;
   b) increasing the rotational speed.

In one embodiment, the determining of the environmental parameters comprises determining the air density and the temperature, wherein, in the event that the temperature decreases and the air density increases, in accordance in particular with the noise level boundary condition, the adaptation of the operational control comprises at least one of the following measures:
   a) raising the nominal power while simultaneously reducing the rotational speed in order to maintain the noise level boundary condition, and, in the event of a non-critical noise level boundary condition, reducing same only as far as maintaining the load boundary condition;
   b) optionally increasing the pitch until the load boundary condition is maintained.

In this embodiment, the control is thus optimized to combined changes in the air density and the temperature. Thermal reserves from a low temperature, lower load reserves and lower noise reserves from a higher density can be combined with one another here.

In a further aspect, a wind power installation with a controller is proposed, wherein the controller is configured to control the wind power installation according to a method as per the disclosure.

The wind power installation makes it possible to achieve the same advantages as are described in conjunction with the method according to the disclosure. The controller of the wind power installation can be particularly configured to carry out one embodiment, a plurality of embodiments or all the embodiments described as being preferred and can achieve the optimized control associated therewith.

Furthermore, a wind farm with a plurality of wind power installations according to the disclosure is proposed.

The wind farm also makes it possible to achieve the same advantages as are described in conjunction with the method according to the disclosure. The controller of the plurality of wind power installations of the wind farm can be particularly configured to carry out one embodiment, a plurality of embodiments or all of the embodiments described as being preferred and to achieve the optimized control associated therewith.

BRIEF DESCRIPTION OF THE SEVERAL VIEWS OF THE DRAWINGS

Further advantages and preferred refinements will be described in detail below with reference to the attached figures, in which.

DETAILED DESCRIPTION

Figure 1:
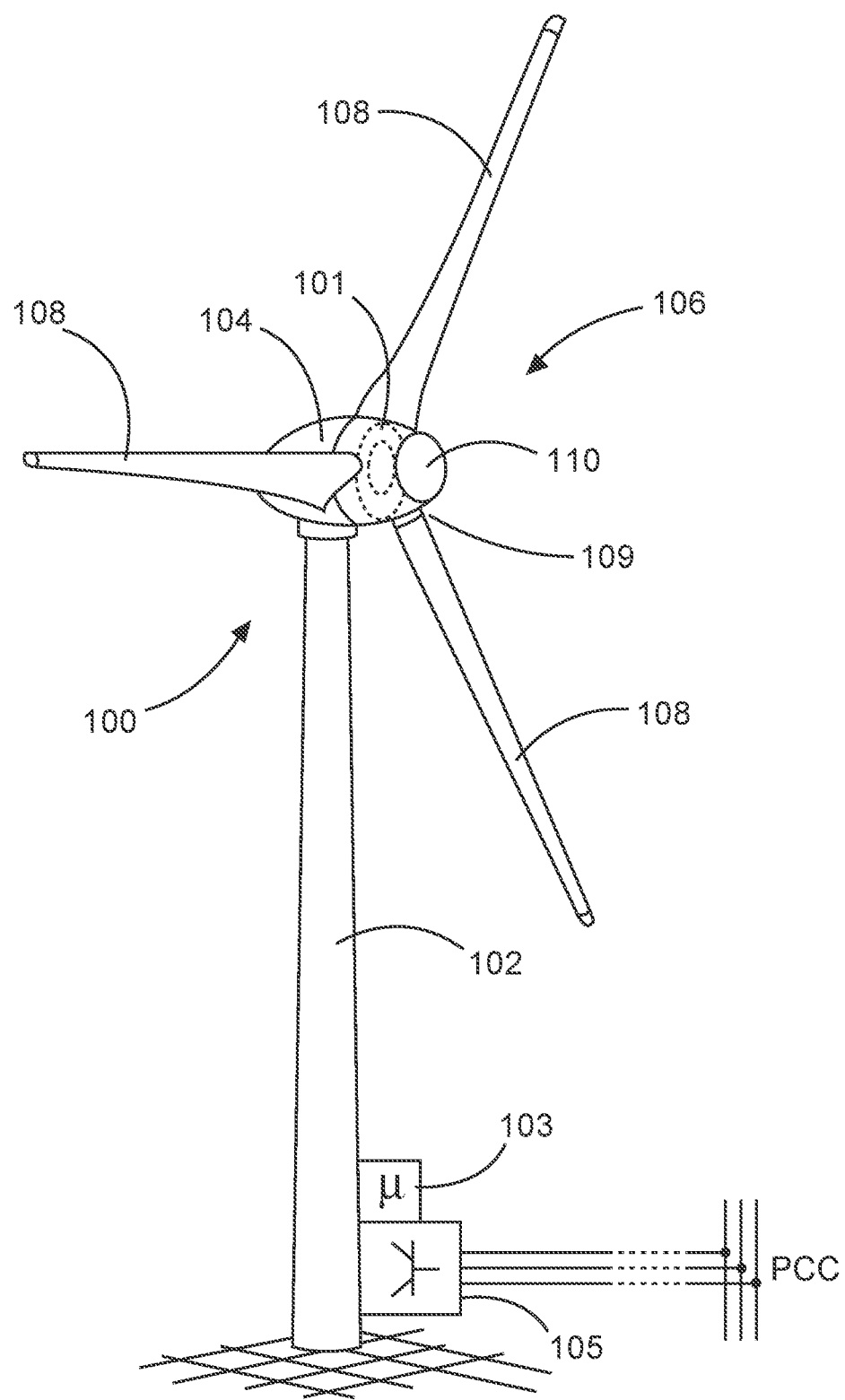
FIG. 1 shows a wind power installation schematically and by way of example.

FIG. 1 shows a schematic illustration of a wind power installation 100. The wind power installation 100 has a tower 102 and a nacelle 104 on the tower 102. An aerodynamic rotor 106 with three rotor blades 108 and a spinner 110 is provided on the nacelle 104. During operation of the wind power installation, the aerodynamic rotor 106 is set into a rotary motion by the wind, and thereby also rotates an electro-dynamic rotor of a generator, which is coupled directly or indirectly to the aerodynamic rotor 106. The electric generator is arranged in the nacelle 104 and generates electrical energy. The pitch angles of the rotor blades 108 can be changed by pitch motors at the rotor blade roots 109 of the respective rotor blades 108.

The wind power installation 100 here has an electric generator 101 which is indicated in the nacelle 104. Electrical power can be generated by means of the generator 101. In order to feed in electrical power, a feed-in unit 105 is provided which can be designed particularly as an inverter. A three-phase feed-in current and/or a three-phase feed-in voltage can therefore be generated in accordance with amplitude, frequency and phase, for feeding in at a grid connection point PCC. This can be undertaken directly or else together with further wind power installations in a wind farm. An installation controller 103 is provided for controlling the wind power installation 100 and also the feed-in unit 105. The installation controller 103 can also receive default values from externally, in particular from a central farm computer.

Figure 2:
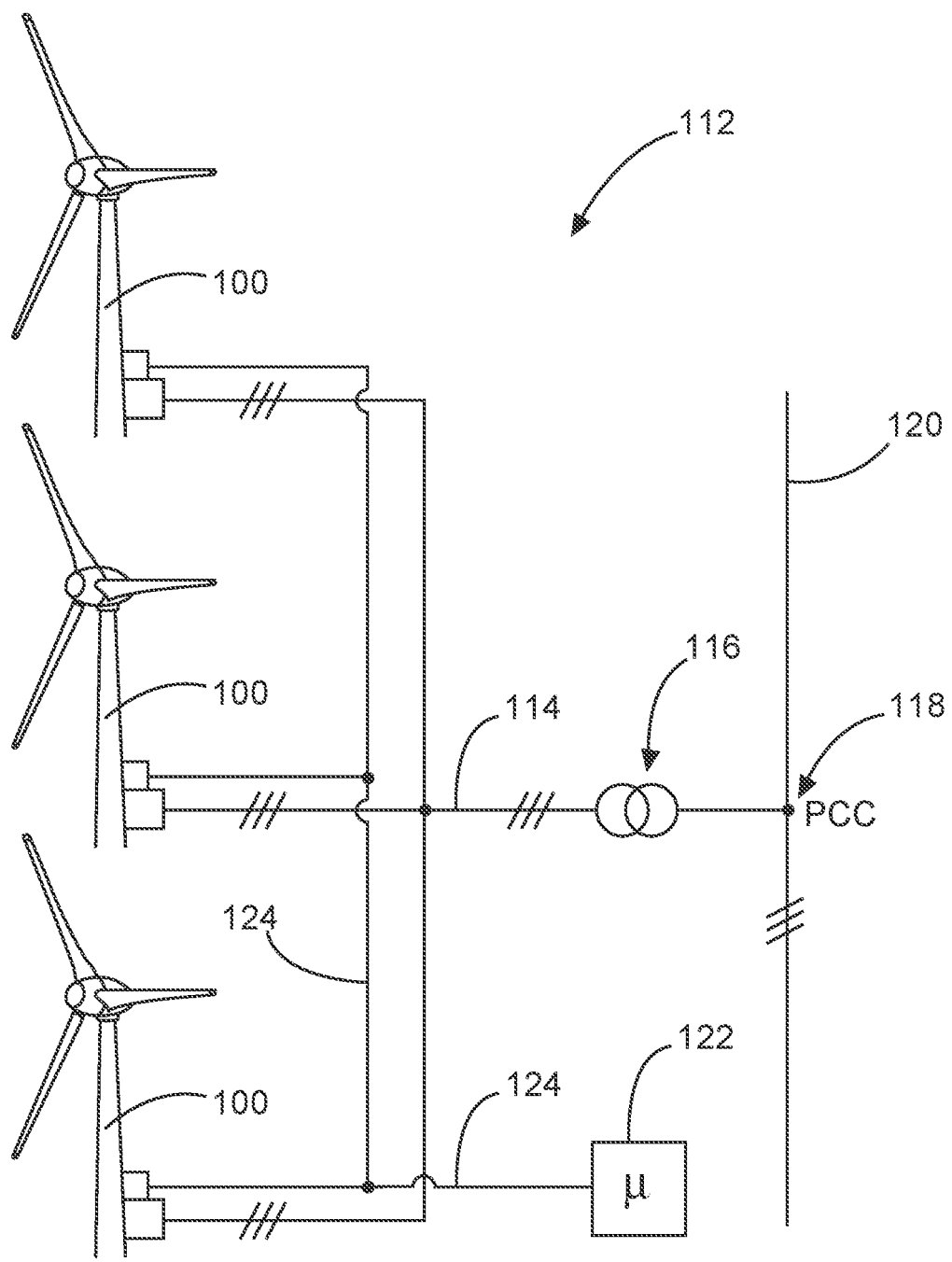
FIG. 2 shows a wind farm schematically and by way of example.

FIG. 2 shows a wind farm 112 with, by way of example, three wind power installations 100, which may be the same or different. The three wind power installations 100 are consequently representative of essentially any number of wind power installations of a wind farm 112. The wind power installations 100 provide their power, to be specific in particular the electricity generated, by way of an electrical farm grid 114. In this case, the electricity or power respectively generated by the individual wind power installations 100 is added together and there is usually a transformer 116, which steps up the voltage in the farm in order then to feed into the supply grid 120 at the feed-in point 118, which is also referred to generally as the PCC. FIG. 2 is just a simplified illustration of a wind farm 112. It is possible for example for the farm grid 114 to be differently designed, in that for example there is also a transformer at the output of each wind power installation 100, to name just one other exemplary embodiment.

The wind farm 112 additionally has a central farm computer 122, which can synonymously also be referred to as the central park controller. Said central farm computer can be connected to the wind power installations 100 via data lines 124, or in a wireless manner, in order thereby to exchange data with the wind power installations and in particular to acquire measured values from the wind power installations 100 and to transmit control values to the wind power installations 100.

The requirements of locations are becoming increasingly more complex and individual. The call for an individual mode of operation permitting the setting of the yield from the guarantee data sheet is therefore becoming louder. However, the guarantee data sheet is calculated with standardized ideal values which depict a statistical average of the wind field and of the environmental conditions.

The individual mode of operation proposes adapting the modes of operation to the parameters of environmental conditions, such as wind field, climate, blade deformation and installation position, that are actually present at the location. Rotational speed (both profile and nominal and desired rotational speed), pitch angle and nominal power can be changed at the installation in order to obtain a maximum yield. The present disclosure proposes a way of how said adjustable parameters can be optimally adjusted or adapted to changing environmental parameters for the yield of the installation.

The boundary conditions of maximum noise output level, maximum loads, controller stability and generator variables are intended to be maintained here. It should be noted here that certain behavior patterns increase non-linearly.

For example, a lower turbulence intensity already leads to a reduced noise output level. In this case, because of the lower tendency of the flow to separate at the blade, the trailing edge noise is additionally reduced. Since the loads at locations with lower turbulence also decrease, the margin gained in accordance with the present disclosure can be invested in an increased maximum rotational speed which leads to higher yields while simultaneously maintaining the design loads and noise guarantee.

In the event of greater stiffening of the blade, because of increased centrifugal forces after an increase in the rotational speed, the elastic deformation of the blade is reduced. This reduces the local angles of attack, and therefore the pitch angles can likewise be reduced, with the angle of attack reserves being simultaneously maintained.

In the first step, an individual operational control can be configured as a discrete operating characteristic. This is optimally configured to the average wind conditions at the location. It is active throughout the service life of the installation.

In the second step, a multidimensional parameter space is introduced to the installation controller. The installation sensor continuously measures the wind field, the environmental conditions, the state of the installation and optionally also noise at a defined point of emission.

The control technology which is implemented in the installation controller 103 preferably ascertains independently and in real time, on the basis of the recorded values, a valid set of parameters of rotational speed and blade angle adjustment in order to achieve the maximum power and to maintain possible sound levels. The boundary conditions of noise output level, loads, controller stability, ranges of inherent frequencies of components, for example rotational speed windows, and generator variables, are intended to be maintained here.

For example, a power increase is necessary if a lower turbulence intensity, a lower density, a lower shear or a more greatly asymmetric wind distribution prevail (Weibull factor<2). This respectively results in a lower extraction of power from the wind, a lower noise output level, a lower propagation of the noise, lower alternating loads, smaller deformation and in an increased distance from angle of attack reserves in relation to a separation at the blade. Accordingly, a rotational speed can be increased and/or angle of attack reserves can be reduced by a smaller pitch. The maximum possible yield can be obtained as a result.

In another example, a load reduction is possible in a case in which increased turbulence intensity, an increased density, an increased shear or a greatly symmetrical wind distribution (Weibull factor>2) are present or are determined. The respective result is then a greater extraction of power from the wind, an increased noise output level, a greater propagation of the noise, increased alternating loads, increased deformation loads and a smaller distance from the angle of attack reserves in relation to a separation at the blade. A reduction in the rotational speed or an increase in the angle of attack reserves due to a lower pitch is indicated as the reaction. As a result, the guaranteed yield is maintained, the noise output level is reduced and the alternating loads reduced in order to maintain the maintenance intervals and calculations of the service life.

The location-specific parameters, which are also referred to as environmental conditions, can be broken down as follows.

The wind field is determined here from the average and the extreme values for one or more, in particular also all of the following:

a) turbulence intensity
b) shear
c) rotation of the wind speed over height (veer)
d) wind direction (yaw)
e) wind frequency, shape of the Weibull distribution
f) incident flow angle of the rotor surface (flow inclination)

The climate can be determined from one or more, in particular all of the following values:
a) density
b) temperature
c) humidity
d) precipitation frequency.

The installation position describes the position in the wind farm 102, i.e., relative to other wind power installations 100 and in the terrain, i.e., relative to orographical characteristics (mountains, valleys, woods).

The state of the installation is described by one or more, in particular all of the following parameters:
a) angle of attack at the blade
b) the instantaneous load states at the blade
c) the accelerations for bypassing hazardous vibrations from the diverse components.

The possible measures for reacting to changed environmental parameters comprise one, a plurality or all of the following adaptations of the operating point or of the operational control:
(1) operating the installation more closely to the cp optimum, by reducing the minimum blade angle $\alpha_{min}$ and reducing the tip-speed-ratio $\lambda$,
(2) adjusting the pitch subsequently, i.e., carrying out an increase in the blade angle at higher wind speeds and/or higher power
(3) increasing the rotational speed of the rotor
(4) increasing the nominal power.

With environmental parameters changed in the opposite direction, an inverted adaptation of the operating point is correspondingly indicated.

Power should be understood here and throughout the context of the present application preferably as the generated electrical power or as a different measure of the power of the wind power installation. Also suitable for example as a value indicative of the power is the air gap power or a torque as the generator.

The precise effects of changing environmental parameters are assessed below for the individual environmental parameters and for combinations of environmental parameters.

Influence on a Wind Power Installation 100 by Changed Density; Background Information The electrical power is calculated by means of:

$$P=\rho \eta_{el} c_p \pi r^2 v_{inv}^3$$

and is therefore linear to the density $\rho$.

At the same time, however, a lower density leads to the wind power installation 100 needing more wind for the same electrical power P, which would lead to a changed $\lambda$ (TSR, tip-speed-ratio). Although the wind power installation 100 can counteract this, it can do so only in the partial load range since an increase in the rotational speed or in the TSR at the nominal point leads to an increased noise output level.

If the TSR cannot be adapted in the nominal power range, this leads to an aerodynamically poorer Cp or operating point of the wind power installation 100.

However, the exact AEP loss depends on profile series, blade design and possibly used accessory parts, such as vortex generators, serrations and, for example, flaps, and also additional interventions in the pitch control, and can be precisely quantified only from wind power installation 100 to wind power installation 100. This also cannot be considered completely separately from turbulence intensity and shear.

If the density decreases below the design density, yield losses should initially be expected or else the nominal power is reached only later, see above.

At the same time, however, loads and noise also decrease, wherein there is already a known approximate relationship for noise.

It follows from reducing noise that in principle the entire operating characteristic can be scaled with the density (cube root of the density), including the nominal rotational speed of the wind power installation 100.

At the same time, the reduction in the density also reduces the loads, in particular for the average values of the blade loads (My) and the installation thrust or the Ct coefficients. At least for certain installation components (for example tower, flapwise torque, azimuth, pitch), this results in space for a "more aggressive" operational control. This can be configured, for example, by adapting the operating characteristic and/or the pitch characteristic. For example, there can be space here for reducing the angle of attack reserve.

Rotating more rapidly: max. SPL still remains below SPL at design density because of the lower density. Additional load reserves of some components are again used up. Extreme loads are customarily not affected in this case. However, some loads (for example flapwise torque) are increased. In addition, erosion of the leading edge of the blade may be a problem. However, erosion is likewise location-dependent (frequency of rain). When a rain sensor is present, an increased desired rotational speed could be omitted during rain in order to avoid excessive erosion. As a result, the AEP losses which arise virtually inevitably because of the lower density are minimized with very substantially identical loads and conformal noise output levels, as before.

The more rapid rotation (for example at least in the partial load range) maintains angle of attack reserves. If an installation under standard settings has sufficient angle of attack reserves, these can be used up by somewhat more aggressive pitch control. Load reserves would then be used up by a combination of changed operating characteristic and pitch characteristic. However, this would result in an increase in the extreme loads, possibly also in the vibration amplitudes in the flapwise direction.

Depending on the installation, a change in the rotation speed/power characteristic (entirely or only in the partial load range) with/without adaptation of the pitch control can be optimum, depending on the load budget of the wind power installation 100 and possibly on further location parameters, for example turbulence intensity.

Figure 3:
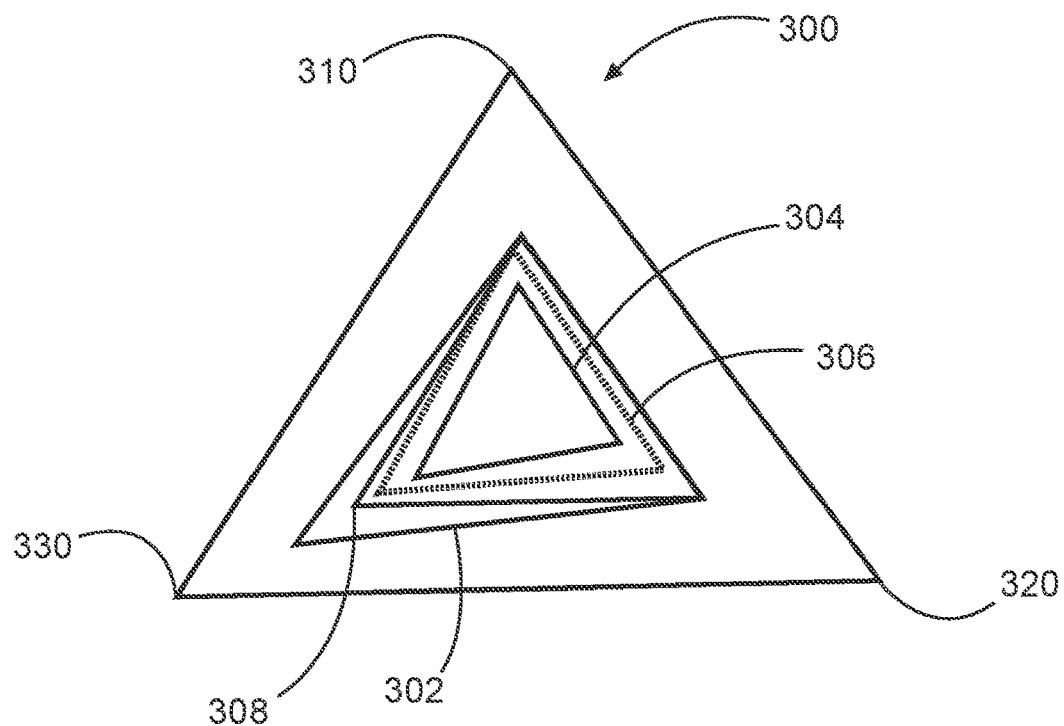
FIG. 3 shows relationships of noise output level, load level and power for different operational controls schematically and by way of example.

FIG. 3 shows, schematically and by way of example, the relationships of noise output level 310, load level 320 and power 330 in a triaxial diagram 300. The load level 320 substantially corresponds to the inverse of the anticipated service life.

For standard air density, i.e., the design case, the state 302 is expected. This provides the maximum power 330 under the permissible framework conditions for noise output level 310 and load level 320. When the operational control is maintained, the state 304 is set for an air density which is reduced in relation to the standard air density. It can be seen that a lower power 330 is also achieved with a lower noise output level 310 and lower load level 320.

By adapting the operational control in accordance with the present disclosure, the state 306 arises. For the state 306, the adaptations comprise in particular a more pronounced adjustment of the pitch in order to reduce the angle of attack reserves and a slight increase in the rotational speed. Like the design state 302, the state 306 meets the requirements imposed on the noise output level 310 and, in comparison to the unchanged operational control in the state 304, leads to an increase in power 330.

The state 306 continues to provide reserves in the load range, and therefore a further increase in power 330 is achieved by the state 308 by the operational control being further adapted in accordance with the present disclosure. For the state 308, the rotational speed has been greatly increased in relation to the design case in order to exhaust the load reserves.

Influence on a Wind Power Installation 100 by Various Shear Values; Background Information The shear coefficient describes the extent to which the wind speed changes over the height of the rotor circular disc.

Figure 4:
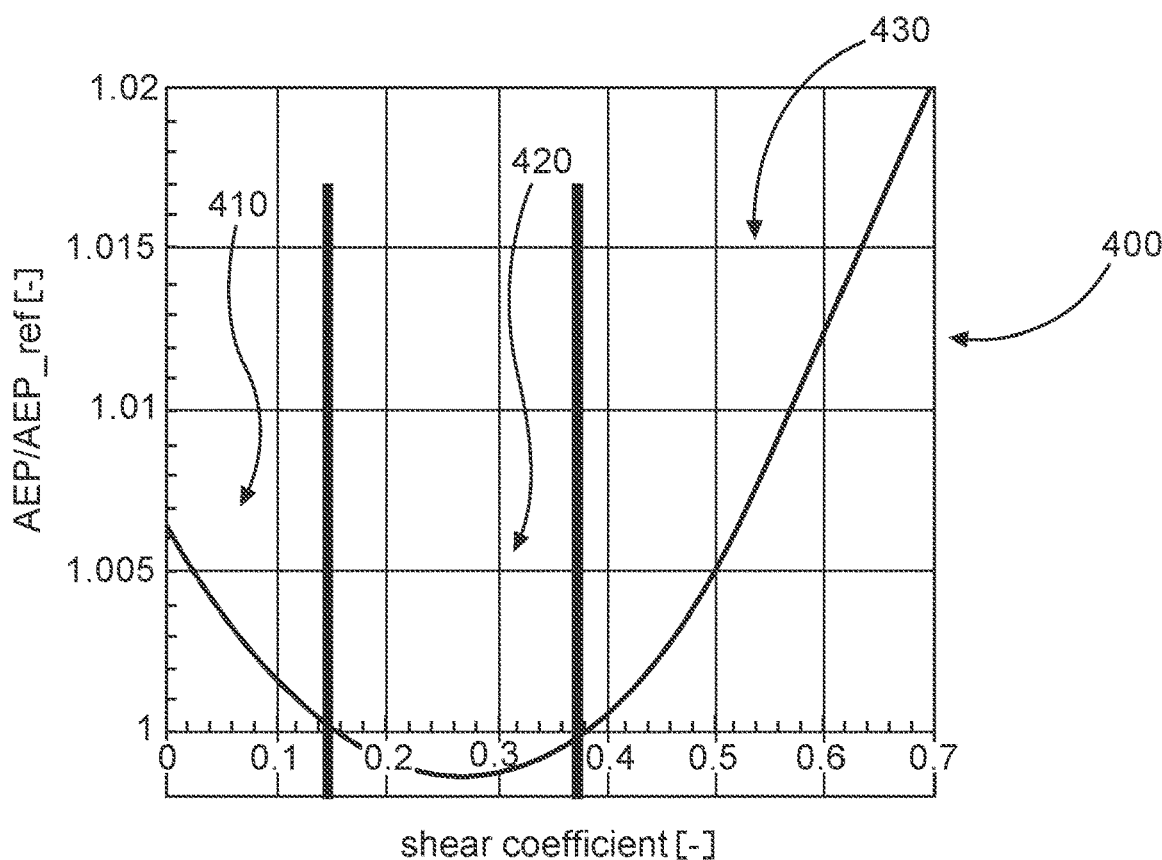
FIG. 4 shows relationships of annual energy production and shear coefficient schematically and by way of example.

FIG. 4 shows, schematically and by way of example, a diagram 400 of the profile of the annual energy production AEP relative to a reference energy production AEPref on the vertical axis over values of the shear coefficient on the horizontal axis:

Low shear coefficients indicate a uniform incident flow with relatively low alternating loads through the wind field.

As the shear coefficient increases, differences in the incident flow speed over the rotor surface and therefore amplitude of the load changes through the wind field and of the angles of attack along the rotor blade increase.

In certain value ranges of the shear coefficient, a reduced speed in the lower rotor disc half cannot be compensated for by an overspeed in the upper rotor disc half, which leads to a power reduction. →Power reduction; in the example of FIG. 4, this corresponds to a range 420 of the shear coefficient of 0.15-0.38.

Above and below the range 420, the reduced speed in the lower rotor disc half is overcompensated for by an overspeed in the upper rotor half, which leads to an increase in power. This relates to the range 410 with a shear coefficient<0.15 and to the range 430 with a shear coefficient>0.38.

Shear Decreases/is Lower than Design Shear (for Example 0.15) and AEP Increases (Range 420 in FIG. 4)

Figure 5:
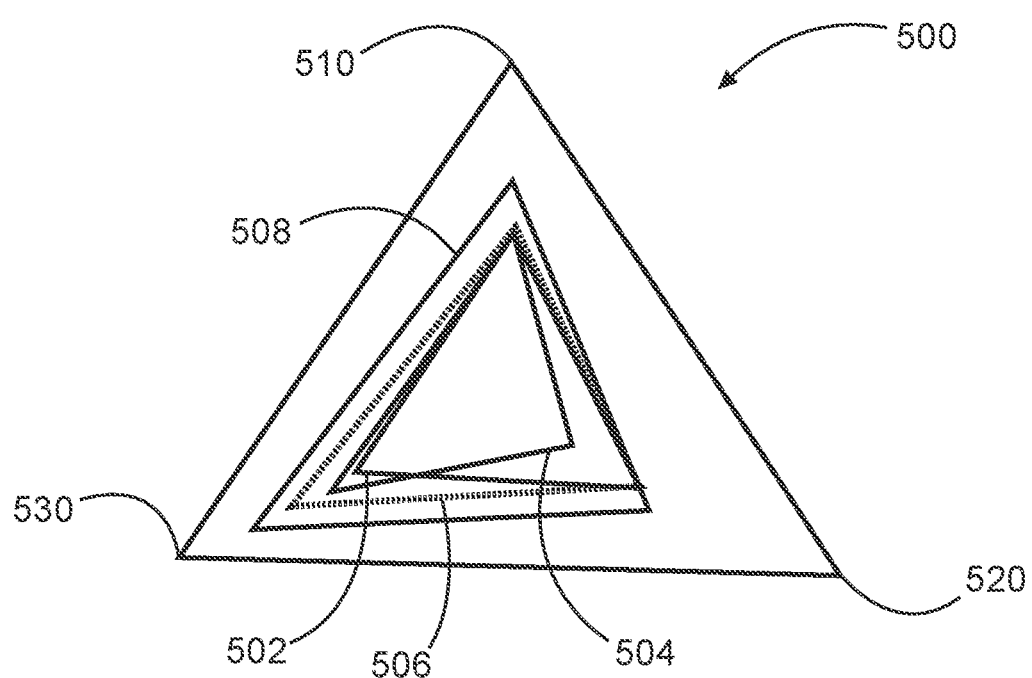
FIG. 5 shows relationships of noise output level, load level and power for different operational controls schematically and by way of example.

FIG. 5 shows, schematically and by way of example, the relationships of noise output level 510, load level 520 and power 530 in a triaxial diagram 500 analogously to the illustration in FIG. 3 with decreasing shear or with a shear below the design shear.

If, at a location, the shear of the incident flow is lower than in the design case (second innermost case, state 502), the wind power installation 100 experiences lower amplitudes in the alternating loads and lower fluctuations in the angles of attack (innermost case, state 504).

A change in the noise output level is provided only indirectly via changed angles of attack along the blade and is negligibly small.

The reserves which have arisen in the loads and the angle of attack reserves for further increase of the AEP can be increased (2) by a more aggressive pitch profile. (State 506).

If the location is free of noise restrictions, the load reserves which have arisen can be increased (3) by an additional increase in the rotational speed (state 508).

In each case, for optimum use of the angle of attack reserves, control can be undertaken via IPC.

Shear Increases/is Greater than Design Shear (for Example 0.15) and AEP Decreases (Range 420 in FIG. 4)

If the shear increases in relation to the design point and the AEP simultaneously decreases, the wind power plant 100 experiences increasing amplitudes in the alternating loads and the angles of attack that cannot be compensated for by increasing the rotational speed and adjusting the pitch subsequently in the upper partial load range. The noise output level increases minimally by increasing the angles of attack.

In order to be able to continue to maintain the reserves in the angles of attack and loads, the reserve is set for each blade via an IPC (AEP neutral) or an adjustment is made in the pitch at an earlier point in the upper partial load range (AEP-reducing).

As a load reduction measure, the rotational speed can likewise be reduced (3rd inverse).

Shear Increases/is Greater than Design Shear (for Example 0.15) and AEP Increases (Range 430 in FIG. 4)

If the shear increases in relation to the design point, the installation experiences further increasing amplitudes in the alternating loads and in the angles of attack. The noise output level increases minimally by increasing the angles of attack.

Since the AEP increases, this clearance can be used in order to maintain the load limits by reducing the rotational speed. Alternatively, loads can be reduced and angle of attack limits maintained by adjusting the pitch at an earlier point in the upper partial load range (2nd inverse).

IPC is also suitable for adjusting the angle of attack limits during the revolution of the blade and for reducing the load in particular in the upper rotor disc half.

Figure 6:
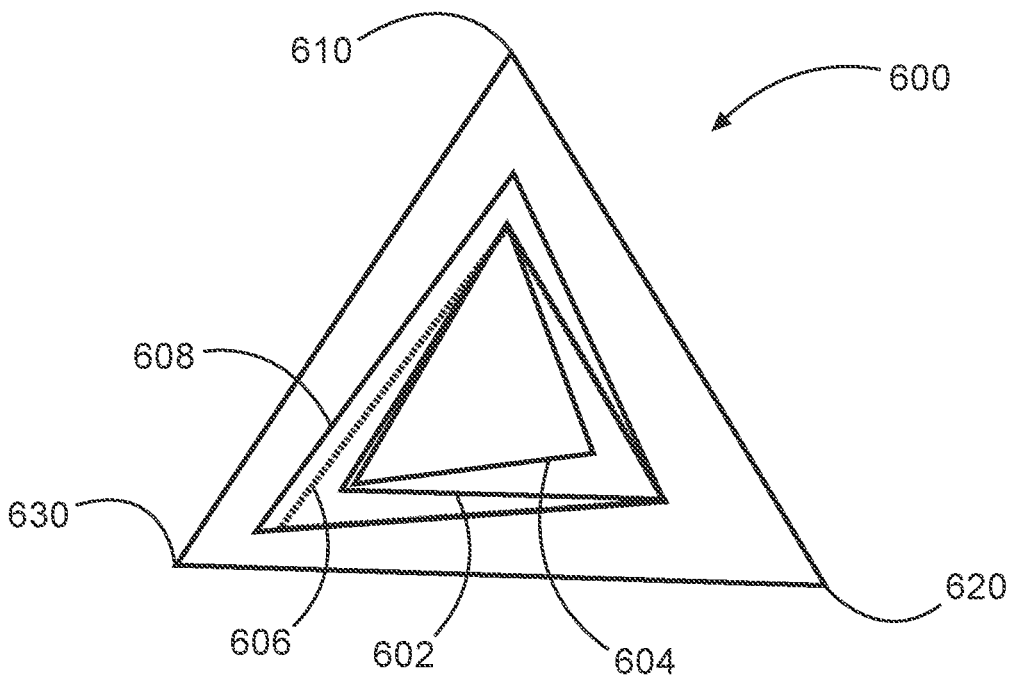
FIG. 6 shows relationships of noise output level, load level and power for different operational controls schematically and by way of example.

Influence on a Wind Power Installation 100 by Changed Turbulence (Lower Here); Background Information FIG. 6 shows, schematically and by way of example, the relationships of noise output level 610, load level 620 and power 630 in a triaxial diagram 600 analogously to the illustration in FIG. 3 with decreasing turbulence.

If, at a location, the turbulence is lower than for the design case (second innermost state 602), the installation has greater angle of attack reserves and load reserves than necessary, and additional slight acoustic reserves (innermost state 604) because of the decreasing inflow noise portion.

The reserves which have arisen in the angles of attack can be used in order to slightly reduce the tip-speed-ratio in the partial load range and to slightly reduce the $\alpha_{min}$, which leads to an improved power (1). At the same time, the reserves in the angles of attack and the loads can be used in order to carry out an adjustment in the pitch at a later point in the high partial load range and thus also to increase the power (2). The greater angles of attack and the thicker boundary layer mean that acoustically slightly higher levels are anticipated which are intended to approximately compensate for the small reserves which have arisen (state 606). Acoustically, the state 606 is identical to the design case.

If the obtained load reserves are intended to be suitable for permitting a slight increase in the maximum rotational speed, in addition to (1) and instead of (2) a rotational speed increase (3) can be implemented (state 608). This measure leads to a greater increase in power than (2), but at the same time also leads to an increase in the noise output level beyond the design case and is therefore possible only for locations without restrictive noise regulation requirements.

Influence on a Wind Power Installation 100 by Changed (Lower Here) Temperature (with the Density Remaining the Same); Background Information It is firstly assumed here that only the temperature decreases below the design temperature, but the density remains at the design value (the assumption would be relevant, for example, to a geodetically slightly raised location in the foothills of the Alps). If the temperature at a location is shown to be lower than the design temperature, thermal reserves are produced in the electrical section.

These could be increased by the nominal power being raised (4) (either as a temporary increase in power or as a permanent nominal power increase).

Depending on whether there is or there is not a noise boundary condition, the load increase associated therewith can be picked up differently: if the location is noise-critical, the rotational speed has to remain identical, and there remains only the option of increasing the torque in order to arrive at the higher nominal power. This leads to increased average values in the Mx.

If there are no restrictive noise regulation requirements, as an alternative the torque can be kept constant and the rotation speed slightly increased (3). As a result, the Mx average values remain identical to the design case. While the gradient of the pitch characteristic is maintained as far as the new nominal power, the average values for My and thrust also remain constant. However, the increase in the rotational speed leads to a slight increase in the number of load cycles/collectives for Mx, My and thrust.

Shear Decreases, Turbulence Intensity Increases

The influence of shear on the yield is non-linear, but in terms of direction/tendency is identical for the entire power range.

By contrast, turbulence intensity leads to more yield in the partial load range, but to a lesser yield in the range about nominal power.

Increasing shear and increasing turbulence intensity both lead to increased alternating loads and both lead to an increased SPL, and, in association therewith, both also lead to lower angle of attack reserves.

Shear and turbulence intensity are generally connected, for example low turbulence intensity and high shear at night (stable layering of the atmosphere), and in the day (days of insolation/sun, high thermals), the turbulence intensity is high, but the shear low.

Higher turbulence intensity leads to increased loads and lower yield of nominal power. In addition, angle of attack reserves are reduced.

Turbulence intensity leads to increased angles of attack in particular in the blade inner region as far as the blade central region.

Low shear can "protect" angle of attack reserves in the blade outer region and counteract the increase in load.

In order to compensate for increased turbulence intensity of nominal power, the influence of turbulence intensity and shear can be "calculated," both for the loads and for the angle of attack reserve, wherein the angle of attack reserves are relevant primarily in the blade outer region.

If sufficient reserves remain, the pitch can be adjusted more aggressively in the range around nominal power (2) and/or the nominal power can, however, be increased briefly in order to compensate for the gustiness of the wind (4).

In the partial load range (low wind speed), the wind power installation 100 typically profits from the increased turbulence intensity, and load-increasing measures do not have to be taken in order to increase the power. However, when there is a corresponding reserve—after calculating using the pitch—a reduction of $\alpha_{min}$ and/or of the tip-speed-ratio is possible (1).

Shear Increases, Turbulence Intensity Decreases

High shear leads to lower angle of attack reserves and increased alternating loads. At the same time, low turbulence intensity leads to lower loads. Angle of attack reserves and load effects can be calculated in relation to one another.

Low turbulence intensity means less yield in particular in the partial load range.

At the same time, if there should still be somewhat more angle of attack reserve in the partial load range, a reduction in the minimum pitch angles and a reduction in the tip-speed-ratio (1) will be taken into consideration if there is still potential for optimization.

In the nominal power range, the low turbulence intensity has a positive effect, if there are still load and angle of attack reserves, because of the low gustiness, these can readily be increased by a more aggressive adjustment of the pitch (2).

Density and Turbulence Intensity Increase

If the density and turbulence intensity increase at a location, the AEP, the loads and the noise output level are increased. The latter is caused by the increased inflow noise. In addition, the noise transport through the air is improved, and therefore an increased noise output level is measured at the emission point. However, the angles of attack decrease because of the increased density.

The margin which has arisen in the AEP can be used to reduce the loads by slower rotation (3rd inverse). This also has the consequence of reducing noise. The effect of the increased density (decreasing angles of attach) and of the increasing turbulence intensity (increasing angles of attack) can be compensated for by greater/weaker adjustment of the pitch (2/2nd inverse), depending on which effect dominates. At the same time, possibly in the partial load range, the angle of attack reserve has to be increased by an increase in the tip-speed-ratio and in the $\alpha_{min}$ (inverse 1).

Density Increases and Turbulence Intensity Decreases

If the density increases as the turbulence intensity decreases, the effects for loads and noise are compensated. By means of the increasing density, the loads (average values) increase while the decreasing turbulence intensity has a load-reducing effect (collectives). The same trend is apparent in the noise output level. By means of the lower turbulence intensity, the inflow noise decreases, while the higher density reduces the angles of attack and therefore leads to a lower trailing edge noise. By contrast, the increased noise speed leads to an increased noise output level at the emission point.

Both when the density is increased and the turbulence intensity is reduced, the angle of attack limits increase. This effect can be used, taking into consideration the load reserves obtained in the collectives, for greater adjustment of the pitch (2) and AEP increases which are associated therewith.

A reduction in the rotational speed (3rd inverse) can also compensate for the increased loads (average values).

Density Decreases and Turbulence Intensity Increases

The behavior is inverse to that described in the point "density increases and turbulence intensity decreases."

A possible appropriate reaction is adjustment of the pitch at an earlier point (2nd inverse) paired with an increase in the rotational speed (3) in order to take into consideration the decreased angle of attack limits.

Density and Turbulence Intensity Decrease

The behavior is inverse to "density and turbulence intensity increase."

Accordingly, a combination of increase in rotational speed (3) and more aggressive pitch control (2) and a reduction in the angle of attack reserve in the partial load range through (1) is appropriate.

Temperature is Lower and Density is Higher:

This assumption corresponds to an installation with a great geodetic height on a cool day.

It follows from the low temperature that there are thermal reserves. It follows from the low density that there are load reserves and also slight noise reserves.

If noise is critical: It is then appropriate here to increase the nominal power as far as possible (4) and at the same time to increase the rotational speed (3) to such an extent that the noise reserves are exhausted. If further load and angle of attack reserves should be present, these can be realized by a reduction in the pitch (2).

If noise is non-critical: At a low density, it is highly effective to increase the rotational speed. In this case, in addition to the increase in the nominal power (4), the rotational speed is now intended to be increased if at all possible (3 times greater) and all load reserves are used for this purpose.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for operating a wind power installation, the method comprising:
   determining changes in at least two environmental parameters of an environment of the wind power installation, wherein the at least two environmental parameters are selected from turbulence intensity, air density, air temperature, shear, and precipitation,
   providing boundary conditions for operating the wind power installation, the boundary conditions containing at least one boundary condition chosen from a load boundary condition, a noise level boundary condition, and a power boundary condition, and
   adapting an operational control and/or an operating characteristic of the wind power installation based on a combination of the changes in the at least two environmental parameters and taking into consideration the boundary conditions,
   wherein the determining changes in the at least two environmental parameters comprises determining changes in the turbulence intensity,
   wherein in response to a reduction in the turbulence intensity, increasing an angle of attack reserve and a load reserve, and wherein the adapting the operational control and/or an operating characteristic comprises:
   a) reducing a tip-speed-ratio and/or a minimum blade angle in an upper partial load range in order to increase the power, and
   b) displacing a pitch characteristic in the upper partial load range towards higher powers in order to compensate for the load and angle of attack reserves which have arisen, or
   c) in addition to a) and alternatively to b), increasing a rotor rotational speed of the wind power installation taking into consideration the noise level boundary condition.

2. The method according to claim 1, further comprising:
   providing a current operating point of the wind power installation, and
   determining an adaptation of the operational control of the wind power installation based on the changes in each of the at least two environmental parameters, respectively, and on the current operating point,
   wherein the adapting the operational control and/or an operating characteristic comprises adapting the current operating point of the wind power installation based on a combination of the determined adaptations taking into consideration the boundary conditions.

3. The method according to claim 1, wherein the at least two environmental parameters are determined on a recurring basis, wherein the recurring basis is periodically or continuously during an operation of the wind power installation.

4. The method according to claim 1, wherein in case the boundary conditions specify at least one of a load reserve, a noise level reserve, or a power reserve for operation of the wind power installation, the step of adapting the operational control and/or the operating characteristic comprises at least one of the following:
   reducing a minimum blade angle and reducing a tip-speed-ratio to reduce a distance of a first operating point from a second operating point with an optimum power coefficient,
   shifting or changing a characteristic for controlling pitch angles of rotor blades, referred to as pitch characteristic, to higher pitch angles for at least part of the operating range,
   increasing a rotor rotational speed of the wind power installation, and
   increasing a nominal power of the wind power installation.

5. The method according to claim 1, wherein the determining changes in the at least two environmental parameters comprises determining changes in the air density,
   wherein a reduction in the air density leads to an increase of a load reserve and of a noise level reserve and, as a consequence, to adapting the operational control,
   wherein a rotor rotational speed is increased to compensate for a change in the tip-speed-ratio using the noise level reserve, and/or
   wherein the operating characteristic is a rotational speed/power characteristic and/or a pitch characteristic that is adapted using the load reserve.

6. A method for operating a wind power installation, the method comprising:
   determining changes in at least two environmental parameters of an environment of the wind power installation, wherein the at least two environmental parameters are selected from turbulence intensity, air density, air temperature, shear, and precipitation,
   providing boundary conditions for operating the wind power installation, the boundary conditions containing at least one boundary condition chosen from a load boundary condition, a noise level boundary condition, and a power boundary condition, and
   adapting an operational control and/or an operating characteristic of the wind power installation based on a combination of the changes in the at least two environmental parameters and taking into consideration the boundary conditions, wherein shear is selected as one of the at least two environmental parameters, the method comprising:
  determining a change in a shear coefficient indicative of a change in a vertical direction of a wind speed over a rotor plane of a rotor of the wind power installation,
  wherein a reduction in the shear coefficient corresponds to a more uniform incident flow with relatively lower alternating loads,
  comparing the shear coefficient with a predetermined shear threshold value,
  wherein the predetermined shear threshold value corresponds to the shear coefficient with a minimum of power output, and
  adapting the operational control and/or an operating characteristic by adapting an operating point in accordance with the change in the shear coefficient and a comparison of the shear coefficient with the predetermined shear threshold value.

7. The method according to claim 6, wherein a power reduction range is defined as a value range of the shear coefficient, for which a reduced speed in a lower half of a rotor disc cannot be compensated for by an increased speed in an upper half of the rotor disc and thus a power reduction takes place, wherein a shear coefficient at a lower end of the power reduction range is defined as a design shear coefficient, and
  wherein the operating point is adapted in accordance with a change in the shear coefficient and the comparison of the shear coefficient with the design shear coefficient.

8. The method according to claim 7, wherein:
  in the event that a reduction in the shear coefficient occurs in a range below the design shear coefficient, the method comprises adapting the operating point in such a manner that an additional load and/or angle of attack reserves for increasing an annual energy production result in an increase in a rotational speed and/or in a more aggressive pitch profile upon individual adjustment of individual rotor blades.

9. The method according to claim 7, wherein in the event that an increase in the shear coefficient occurs in the value range above the design shear coefficient but within the power reduction range, the operating point is adapted in such a manner that, in order to maintain a load and/or angle of attack reserves, at least one of the following adaptations takes place:
  individually adjusting rotor blades in order to reduce loads in the upper half of the rotor disc,
  adjusting a pitch at an earlier point in upper partial load range in order to reduce the loads, and
  reducing a rotational speed in order to maintain the load limits.

10. The method according of claim 7, wherein in the event that an increase in the shear coefficient occurs in a range above the design shear coefficient and outside the power reduction range, wherein the operating point is adapted in such a manner that, in order to maintain the load and/or angle of attack reserves, at least one of the following adaptations takes place:
  individually adjusting rotor blades without losses of an annual energy production,
  adjusting a pitch at an earlier point in an upper partial load range, and
  reducing a rotational speed in order to reduce the loads.

11. A method for operating a wind power installation, the method comprising:
  determining changes in at least two environmental parameters of an environment of the wind power installation, wherein the at least two environmental parameters are selected from turbulence intensity, air density, air temperature, shear, and precipitation,
  providing boundary conditions for operating the wind power installation, the boundary conditions containing at least one boundary condition chosen from a load boundary condition, a noise level boundary condition, and a power boundary condition,
  adapting an operational control and/or an operating characteristic of the wind power installation based on a combination of the changes in the at least two environmental parameters and taking into consideration the boundary conditions,
  wherein the determining changes in the at least two environmental parameters comprises determining changes in the temperature and the air density,
  determining a thermal reserve in an electrical section of the wind power installation in case the temperature reduces and the air density remains the same, wherein, upon establishing a thermal reserve, the adapting the operational control and/or an operating characteristic comprises:
    increasing a power, either as a temporary power increase or as a permanent nominal power increase, wherein the increasing the power is in accordance with the noise level boundary condition comprises:
      increasing a rotational speed of a rotor with an existing noise level reserve, or
      increasing a torque without an existing noise level reserve.

12. The method according to claim 1, wherein the determining changes in the at least two environmental parameters comprises determining changes in the shear and the turbulence intensity,
  wherein an influence of the shear and of the turbulence intensity on the load and the angle of attack reserve is calculated, and the adapting the operational control and/or an operating characteristic in accordance with the load and angle of attack reserve comprises at least one of the following steps:
    adapting a pitch characteristic in a partial load range with existing load and angle of attack reserves and reducing a minimum blade angle and/or a tip-speed-ratio; and
    increasing a nominal power to compensate wind gust.

13. A method for operating a wind power installation, the method comprising:
  determining changes in at least two environmental parameters of an environment of the wind power installation, wherein the at least two environmental parameters are selected from turbulence intensity, air density, air temperature, shear, and precipitation,
  providing boundary conditions for operating the wind power installation, the boundary conditions containing at least one boundary condition chosen from a load boundary condition, a noise level boundary condition, and a power boundary condition, and
  adapting an operational control and/or an operating characteristic of the wind power installation based on a combination of the changes in the at least two environmental parameters and taking into consideration the boundary conditions,
  wherein the determining changes in the at least two environmental parameters comprises determining changes in the air density and the turbulence intensity, wherein a higher annual energy production, higher loads and a higher noise output level is determined in the event that both the air density and the turbulence intensity increase, wherein, in this case, the adapting the operational control comprises at least one of the following steps:
  a) changing a pitch characteristic by taking into account decreasing angles of attack due to increased air density and increasing angles of attack due to increased turbulence intensity;
  b) reducing a rotational speed to reduce loads and a noise output level; and
  c) increasing an angle of attack reserve in a partial load range by increasing a tip-speed-ratio and/or a minimum blade angle,
wherein, in the event that both the air density and the turbulence intensity decrease, at least one of steps a), b) and c) are used in inverted form in order to adapt the operational control.

14. A method for operating a wind power installation, the method comprising:
  determining changes in at least two environmental parameters of an environment of the wind power installation, wherein the at least two environmental parameters are selected from turbulence intensity, air density, air temperature, shear, and precipitation,
  providing boundary conditions for operating the wind power installation, the boundary conditions containing at least one boundary condition chosen from a load boundary condition, a noise level boundary condition, and a power boundary condition, and
  adapting an operational control and/or an operating characteristic of the wind power installation based on a combination of the changes in the at least two environmental parameters and taking into consideration the boundary conditions,
  wherein the determining changes in the at least two environmental parameters comprises determining changes in the air density and the turbulence intensity,
  wherein, in the event that the air density increases and the turbulence intensity decreases, the adapting the operational control comprises at least one of the following steps:
    changing a pitch characteristic to increase an annual energy production; and
    reducing a rotational speed to compensate for increased loads including load average values.

15. A method for operating a wind power installation, the method comprising:
  determining changes in at least two environmental parameters of an environment of the wind power installation, wherein the at least two environmental parameters are selected from turbulence intensity, air density, air temperature, shear, and precipitation,
  providing boundary conditions for operating the wind power installation, the boundary conditions containing at least one boundary condition chosen from a load boundary condition, a noise level boundary condition, and a power boundary condition, and
  adapting an operational control and/or an operating characteristic of the wind power installation based on a combination of the changes in the at least two environmental parameters and taking into consideration the boundary conditions,
  wherein the determining changes in the at least two environmental parameters comprises determining changes in the air density and the turbulence intensity,
  wherein, in the event that the air density decreases and the turbulence intensity increases, the adapting operational control comprises at least one of the following steps:
    changing a pitch characteristic by adjusting a pitch at an earlier point; and
    increasing rotational speed.

16. The method according to claim 1, wherein the determining changes in the at least two environmental parameters comprises determining changes in the air density and the temperature,
  wherein, in the event that the temperature decreases and the air density increases, the adapting the operational control comprises under consideration of a noise level boundary condition, further comprising at least one of the following steps:
    raising the nominal power while simultaneously reducing the rotational speed to maintain the noise level boundary condition, and, in the event of a noncritical noise level boundary condition, reducing the nominal power only as far as maintaining the load boundary condition; and
    increasing a pitch until the load boundary condition is maintained.

17. A wind power installation comprising:
a tower;
a nacelle;
at least one rotor blade; and
a controller configured to carry out the method according to claim 1.

18. A wind farm comprising a plurality of wind power installations according to claim 17.

* * * * *